United States Patent
Sonoda et al.

(10) Patent No.: US 7,707,814 B2
(45) Date of Patent: May 4, 2010

(54) FUEL-FLOW-RATE CONTROL DEVICE FOR POWER GENERATION SYSTEM

(75) Inventors: Takashi Sonoda, Hyogo-ken (JP); Shinsuke Nakamura, Hyogo-ken (JP); Akihiko Saito, Hyogo-ken (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 862 days.

(21) Appl. No.: 11/514,237

(22) Filed: Sep. 1, 2006

(65) Prior Publication Data

US 2007/0051109 A1  Mar. 8, 2007

(30) Foreign Application Priority Data

Sep. 8, 2005  (JP)  ............................ 2005-260579

(51) Int. Cl.
*F02C 9/28* (2006.01)
(52) U.S. Cl. ...................................... 60/39.281; 60/243
(58) Field of Classification Search ............... 60/39.27, 60/39.281, 240, 243
See application file for complete search history.

(56) References Cited

U.S. PATENT DOCUMENTS 3,255,586 A * 6/1966 Hennig et al ................... 60/773
3,834,158 A * 9/1974 Oppmann .................. 60/39.281
4,294,069 A * 10/1981 Camp .......................... 60/238

FOREIGN PATENT DOCUMENTS

JP  6-193471  7/1994

* cited by examiner

*Primary Examiner*—Louis J Casaregola
(74) *Attorney, Agent, or Firm*—Wenderoth, Lind & Ponack, L.L.P.

(57) ABSTRACT

A fuel-flow-rate control device, a power generation system, and a fuel-flow-rate control method which can prevent overshooting of a gas turbine output (gas turbine inlet temperature) and which can improve power generation efficiency are provided. The fuel-flow-rate control device includes a computing portion for obtaining a state quantity relating to operating conditions and temperature conditions of a gas turbine as an input signal and computing a fuel-flow-rate command for controlling a fuel flow rate supplied to a combustor based on the above input signal, and a second selection circuit for setting the above fuel-flow-rate command to be not more than a fuel-flow-rate upper limit. The fuel-flow-rate upper limit is a fuel flow rate at which the gas turbine inlet temperature is set to be not more than a predetermined upper temperature limit.

4 Claims, 14 Drawing Sheets

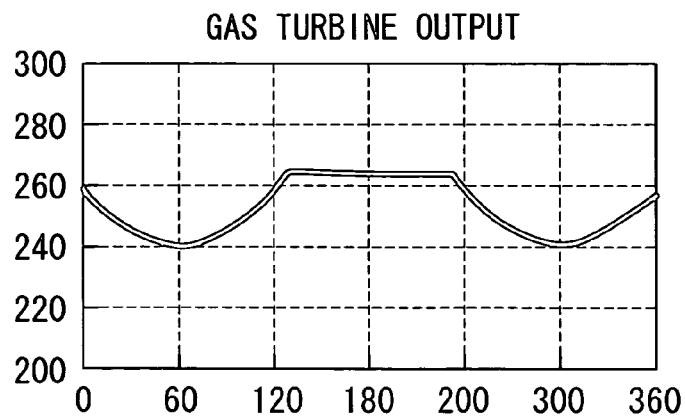
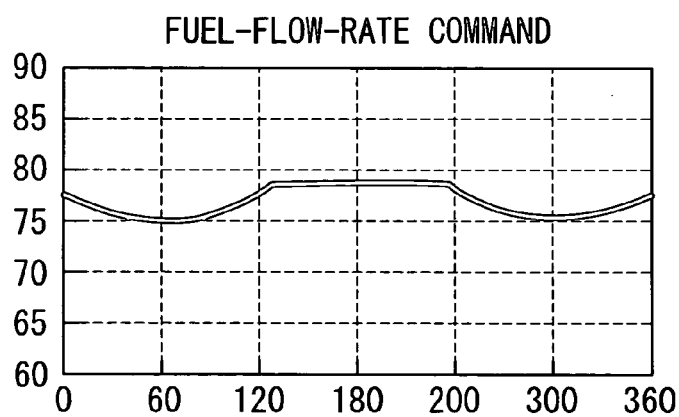
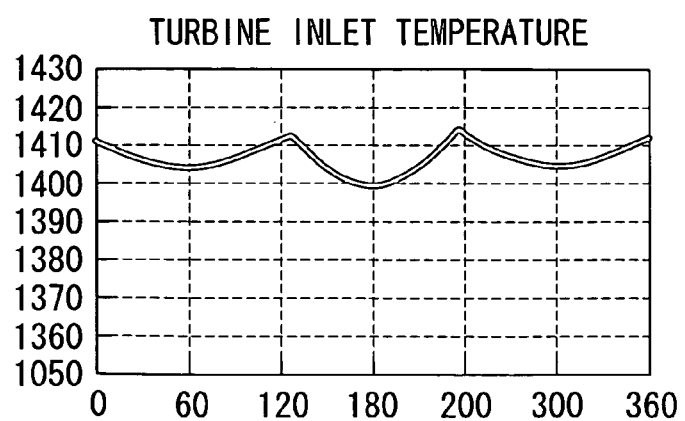

FUEL-FLOW-RATE CONTROL DEVICE FOR POWER GENERATION SYSTEM

BACKGROUND OF THE INVENTION

1. Field of the Invention

The present invention relates to a fuel-flow-rate control device for controlling a fuel flow rate of a gas turbine, to a power generation system, and to a method for controlling a fuel flow rate.

This application is based on Japanese Patent Application No. 2005-260579, the content of which is incorporated herein by reference.

2. Description of Related Art

Heretofore, the method disclosed in Japanese Unexamined Patent Application Publication No. 6-193471 (FIG. 2) is a known fuel-flow-rate control method for gas turbines installed in gas turbine power generation facilities and the like.

According to Japanese Unexamined Patent Application Publication No. 6-193471, first, second, and third fuel flow rates are calculated. The first fuel flow rate is for maintaining a desired revolution speed of a gas turbine, the second fuel flow rate is for maintaining a desired temperature of an exhaust gas emitted from the gas turbine, and the third fuel flow rate is for controlling the acceleration so that an inlet temperature of the turbine does not reach a predetermined maximum temperature. In addition, the third fuel flow rate is corrected based on an outlet air temperature of a heat exchanger. A technique in which a fuel flow rate supplied to a combustor is controlled to the smallest fuel flow rate among the first fuel flow rate, the second fuel flow rate, and the corrected third fuel flow rate is also disclosed.

However, in a gas turbine of the related art, when the load is increased in a low-load region including a starting time and when the load is increased in a high-load region in response to a reset operation of a down command for automatic frequency control, there is a problem of overshooting of the inlet temperature of the gas turbine due to the following reasons.

Specifically, in the system of the related art, control is first performed using the revolution speed of the turbine or the fuel flow rate based on a power generator output command, and subsequently, when the gas turbine output is increased to the vicinity of a base load (rated output point), the control method is changed to a method based on temperature, such as the exhaust gas temperature, and the gas turbine output is stabilized at the rated output point. However, during the temperature control, because of a response delay, the gas turbine output may temporarily overshoot the rated output point in some cases, and in association with this overshooting, the gas turbine inlet temperature also overshoots.

Heretofore, in order to suppress this overshooting of the gas turbine inlet temperature, for example, the following methods have been used: a fuel-flow-rate control method in which the rate of change in the load is decreased, and a fuel-flow-rate control method in which the control based on the turbine revolution speed is changed to the control based on the temperature at an early stage. However, neither of the control methods described above are suitable for reducing the starting time, and hence a control method which can shorten the starting time and which can simultaneously improve the efficiency of power generation has been desired.

BRIEF SUMMARY OF THE INVENTION

Accordingly, the present invention has been conceived in order to solve the problem described above, and an object of the present invention is to provide a fuel-flow-rate control device, a power generation system, and a fuel-flow-rate control method in which overshooting of the gas turbine output (gas turbine inlet temperature) can be prevented and the power generation efficiency can be improved.

To these ends, in accordance with a first aspect of the present invention, there is provided a fuel-flow-rate control device configured to control a fuel flow rate supplied to a combustor of a gas turbine which includes: a compressor configured to compress and emit air; the combustor configured to burn a fuel supplied via a fuel pipe together with the compressed air supplied from the compressor and to emit a combustion gas; a turbine configured to be driven by the combustion gas supplied from the combustor; and a power generator configured to be driven by the turbine, the fuel-flow-rate control device comprising: a computing portion configured to obtain a state quantity relating to operating conditions and temperature conditions of the gas turbine as an input signal and to compute a fuel-flow-rate command for controlling the fuel flow rate supplied to the combustor; and a regulating portion configured to set the fuel-flow-rate command obtained by the computing portion to be not more than a fuel-flow-rate upper limit. In the fuel-flow-rate control device described above, the fuel-flow-rate upper limit is set to a fuel flow rate at which an inlet temperature of the turbine is set to be not more than a predetermined upper temperature limit.

According to the configuration described above, since the regulating portion is provided for setting the fuel-flow-rate command determined based on the state quantity relating to the operating conditions and the temperature conditions of the gas turbine to be not more than the fuel-flow-rate upper limit, the fuel flow rate supplied to the combustor can always be set to be not more than the fuel-flow-rate upper limit. Since the fuel-flow-rate upper limit is set to a fuel flow rate at which the inlet temperature of the turbine is set to be not more than a predetermined upper temperature limit (such as 1,500° C.), the inlet temperature of the turbine can always be maintained at not more than the upper temperature limit. Accordingly, overshooting of the inlet temperature of the turbine can be prevented. Furthermore, by the configuration described above, since fine fuel-flow-rate control is not required, unlike the conventional case, the processing and the apparatus therefor can be simplified, and in addition, the fuel-flow-rate command can be increased to the fuel-flow-rate upper limit in a short period of time. Consequently, the starting time of the gas turbine can be shortened, and the power generation efficiency can be improved.

The turbine inlet temperature indicates the temperature between an outlet of the combustor and an inlet of the turbine, that is, the temperature at a position right before the turbine inlet.

In the fuel-flow-rate control device described above, a correction circuit configured to correct the fuel-flow-rate upper limit based on an air flow rate supplied to the compressor is preferably further provided.

As described above, since the correction circuit is provided for correcting the fuel-flow-rate upper limit based on the air flow rate supplied to the compressor, the operating conditions and the like of the gas turbine can be reflected in the fuel-flow-rate control. Hence, the fuel-flow-rate control can be precisely performed, and for example, the power generation efficiency can be further improved. For example, the correction circuit described above corrects the fuel-flow-rate upper limit so that the fuel flow rate supplied to the combustor is decreased as the air flow rate supplied to the compressor is decreased. The reason for this is that since the inlet temperature of the turbine is increased as the air flow rate supplied to the compressor is decreased, this increase in temperature must be prevented.

In the fuel-flow-rate control device described above, a correction circuit configured to correct the fuel-flow-rate upper limit based on the ambient temperature is preferably further provided.

As described above, since the correction circuit is provided for correcting the fuel-flow-rate upper limit based on the ambient temperature, the fuel-flow-rate control can be precisely performed, and for example, the power generation efficiency can be further improved. For example, the correction circuit described above corrects the fuel-flow-rate upper limit so that the fuel flow rate supplied to the combustor is decreased as the ambient temperature is increased. The reason for this is that when the ambient temperature is increased, the air density is decreased, and the air flow rate passing through the compressor is decreased, resulting in an increase in inlet temperature of the turbine. Accordingly, the increase in temperature must be prevented.

In the fuel-flow-rate control device described above, a correction circuit configured to correct the fuel-flow-rate upper limit based on the temperature of a fuel gas supplied to the combustor via the fuel pipe is preferably further provided.

As described above, since the correction circuit configured to correct the fuel-flow-rate upper limit in accordance with the temperature of a fuel gas is provided, the fuel-flow-rate control can be precisely performed, and for example, the power generation efficiency can be further improved. For example, the correction circuit described above corrects the fuel-flow-rate upper limit so that the fuel flow rate supplied to the combustor is decreased as the fuel gas temperature is decreased. The reason for this is that when the fuel gas temperature is low, since the fuel gas is likely to be supplied to the combustor, the temperature inside the combustor is increased, and thereby the inlet temperature of the turbine is increased. Accordingly, this increase in temperature must be prevented.

In the fuel-flow-rate control device described above, a correction circuit configured to correct the fuel-flow-rate upper limit based on a calorific value of a fuel gas supplied to the combustor via the fuel pipe is preferably further provided.

As described above, since the correction circuit configured to correct the fuel-flow-rate upper limit in accordance with the calorific value of the fuel gas is provided, the fuel-flow-rate control can be precisely performed, and for example, the power generation efficiency can be further improved. For example, the correction circuit described above corrects the fuel-flow-rate upper limit so that the fuel flow rate supplied to the combustor is decreased as the calorific value of the fuel gas is decreased. The reason for this is that when the calorific value of the fuel gas is high, the temperature inside the combustor is increased, and thereby the inlet temperature of the turbine is increased. Accordingly, this increase in temperature must be prevented.

In the fuel-flow-rate control device described above, a setting circuit configured to set the fuel-flow-rate upper limit based on the behavior of the fuel-flow-rate command obtained by the computing portion is preferably further provided.

According to the configuration described above, since the setting circuit is provided for setting the fuel-flow-rate upper limit based on the behavior of the fuel-flow-rate command calculated by the computing portion, an optimal fuel-flow-rate upper limit can be set in accordance with the state of the power generation system. Hence, overshooting of the inlet temperature of the turbine is prevented, and at the same time, the power generation efficiency can be further improved.

In the fuel-flow-rate control device described above, the computing portion may comprise: a load controller configured to calculate a load control signal for controlling the fuel flow rate so that the output of the power generator coincides with a target value; an exhaust-gas-temperature controller configured to calculate an exhaust-gas-temperature control signal for controlling the fuel flow rate so that an exhaust gas temperature of the turbine does not exceed an exhaust-gas-temperature upper limit; a blade-path-temperature controller configured to calculate a blade-path-temperature control signal for controlling the fuel flow rate so that a blade path temperature of the turbine does not exceed a blade-path-temperature upper limit; and a selection circuit configured to select a control signal having the lowest value as the fuel-flow-rate command among the load control signal, the exhaust-gas-temperature control signal, and the blade-path-temperature control signal.

According to the configuration described above, the fuel-flow-rate command is selected based, for example, on the exhaust-gas-temperature control signal or the blade-path-temperature control signal, which is closely related to the inlet temperature of the turbine, and hence the inlet temperature of the turbine can be controlled with high precision.

The above exhaust gas temperature is a temperature, for example, in the vicinity of an inlet of an exhaust gas boiler or heat recovery steam generator (HRSG).

In the fuel-flow-rate control device described above, it is preferable that the setting circuit update the fuel-flow-rate upper limit so as to coincide with the exhaust-gas-temperature control signal when the state in which the exhaust-gas-temperature control signal is selected as the fuel-flow-rate command by the selection circuit lasts for a predetermined period of time, and that when the exhaust-gas-temperature control signal selected as the fuel-flow-rate command is switched over to another control signal by the selection circuit, a fuel-flow-rate upper limit which is set at this switchover point be maintained.

Since the setting circuit described above is provided, the fuel-flow-rate upper limit can be set to a suitable value, and besides preventing overshooting of the inlet temperature of the turbine, the power generation efficiency can be further improved. In particular, when the operation of the power generation system becomes stable as designed, the fuel-flow-rate command depends on the control based on the exhaust gas temperature. Hence, when the fuel-flow-rate upper limit is set in accordance with the exhaust gas temperature, stable power generation having superior efficiency can be realized. In addition, when the state in which the exhaust-gas-temperature control signal is selected lasts for a predetermined period of time, the fuel-flow-rate upper limit is updated, and hence the fuel-flow-rate upper limit is prevented from being frequently changed (in other words, the generation of chattering can be prevented).

In the fuel-flow-rate control device described above, it is preferable that when the state in which the exhaust-gas-temperature control signal is selected as the fuel-flow-rate command by the selection circuit lasts for a predetermined period of time, the setting circuit update the fuel-flow-rate upper limit so as to coincide with the exhaust-gas-temperature control signal; when the exhaust-gas-temperature control signal selected as the fuel-flow-rate command is switched over to another control signal by the selection circuit, a fuel-flow-rate upper limit which is set at this switchover point be maintained; and when this maintained state lasts for a predetermined period of time, the fuel-flow-rate upper limit be updated to the present fuel-flow-rate command.

Since the above setting circuit is provided, the state of the power generation system can be reflected in setting of the fuel-flow-rate upper limit, and hence the fuel-flow-rate upper limit can be set to a more preferable value.

Accordingly, for example, the power generation efficiency can be further improved.

The fuel-flow-rate control device according to the first aspect of the present invention is preferably used for a power generation system, in particular, for a hybrid power generation system having a gas turbine and a steam turbine. When this fuel-flow-rate control device is employed, the output of power generation devices can be stabilized, and overshooting of the inlet temperature of the turbine can be prevented, so that the power generation efficiency can be further improved.

In accordance with a second aspect of the present invention, there is provided a method for controlling a fuel flow rate supplied to a combustor of a gas turbine which has a compressor configured to compress and emit air; a combustor configured to burn a fuel supplied from a fuel pipe together with the compressed air supplied from the compressor and to emit a combustion gas; a turbine configured to be driven by the combustion gas supplied from the combustor; and a power generator configured to be driven by the turbine. The method described above comprises: a computing step configured to obtain a state quantity relating to operating conditions and temperature conditions of the gas turbine as an input signal and to compute a fuel-flow-rate command for controlling the fuel flow rate supplied to the combustor; and a regulating step in which the fuel-flow-rate command is set to be not more than a fuel-flow-rate upper limit at which an inlet temperature of the turbine is set to be not more than a predetermined upper temperature limit.

According to the method described above, since the fuel-flow-rate command set based on the state quantity relating to the operating conditions and temperature conditions of the gas turbine is controlled to be not more than the fuel-flow-rate upper limit, the fuel flow rate supplied to the combustor can always be set to be not more than the fuel-flow-rate upper limit. In this method, since the fuel-flow-rate upper limit is set to a fuel flow rate at which the inlet temperature of the turbine is set to be not more than a predetermined upper temperature limit, the inlet temperature of the turbine can always be maintained at not more than the upper temperature limit. Hence, overshooting of the inlet temperature of the turbine can be prevented. Furthermore, according to this method, the fuel-flow-rate command can be increased to the fuel-flow-rate upper limit in a short period of time. Accordingly, the starting time of the gas turbine can be shortened, and the power generation efficiency can be improved.

The present invention affords advantages in that overshooting of the gas turbine output, in other words, overshooting of the inlet temperature of the gas turbine, can be prevented, and in that the power generation efficiency can also be improved.

BRIEF DESCRIPTION OF THE DRAWINGS

FIG. 21 is a view showing the change in gas turbine output obtained when the ambient temperature is changed as shown in FIG. 20 in a power generation system of the sixth embodiment;

FIG. 22 is a view showing the change in fuel-flow-rate command obtained when the ambient temperature is changed as shown in FIG. 20 in the power generation system of the sixth embodiment; and FIG. 23 is a view showing the change in turbine inlet temperature obtained when the ambient temperature is changed as shown in FIG. 20 in the power generation system of the sixth embodiment.

DETAILED DESCRIPTION OF THE INVENTION

Hereinafter, power generation systems according to embodiments of the present invention will be described with reference to the figures.

First Embodiment

Figure 1:
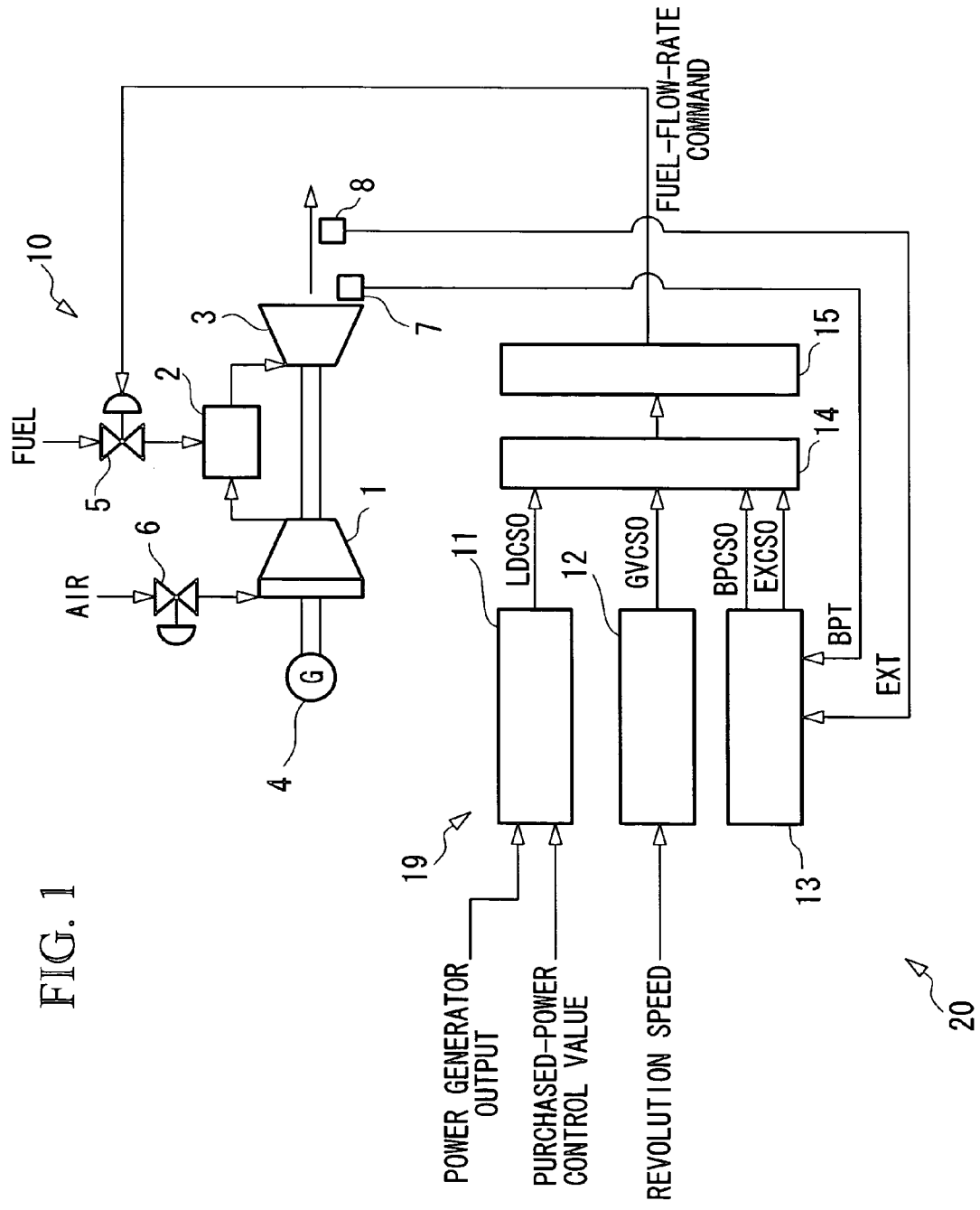
FIG. 1 is a schematic view showing the overall configuration of a power generation system according to a first embodiment of the present invention.

FIG. 1 is a schematic view showing the overall configuration of a power generation system 10 according to a first embodiment of the present invention.

As shown in FIG. 1, the power generation system 10 has a compressor 1 which compresses and emits air, a combustor 2 which burns a fuel supplied via a fuel pipe together with the compressed air supplied from the compressor 1 and emits a combustion gas, a gas turbine 3 driven by the combustion gas supplied from the combustor 2, and a power generator 4 driven by the gas turbine 3. In this power generation system 10, the compressor 1, the gas turbine 3, and the power generator 4 are connected to each other.

Exhaust gas passing through the gas turbine 3 is sent to a steam turbine (not shown) and the like via an exhaust duct to exploit the energy of the exhaust gas.

A fuel-flow-rate regulating valve 5 regulating a fuel flow rate is provided for the fuel pipe of the combustor 2. The valve opening of this fuel-flow-rate regulating valve 5 is controlled by a fuel-flow-rate control device 20 which will be described later.

An air-flow-rate regulating valve (hereinafter referred to as an "IGV regulating valve") 6 regulating an air flow rate is provided for an air pipe supplying air to the compressor 1.

In the vicinity of the final stage of the gas turbine 3, a BPT sensor 7 is provided to measure an exhaust gas temperature (hereinafter referred to as a "blade path temperature") immediately behind the final stage of the gas turbine 3. In addition, further downstream of the final stage of the gas turbine 3, an EXT sensor 8 is provided to measure an exhaust gas temperature (hereinafter referred to as an "exhaust gas temperature") in an exhaust gas duct located downstream of the final stage of the gas turbine 3. Thermocouples, for example, may be used for the above sensors. The temperatures measured by the BPT sensor 7 and the EXT sensor 8 are transmitted to the fuel-flow-rate control device 20.

The fuel-flow-rate control device 20 of this embodiment is formed of a computing portion 19 and a second selection circuit (regulating portion) 15.

The computing portion 19 obtains a state quantity relating to the operating conditions and temperature conditions of the gas turbine as an input signal and then computes a fuel-flow-rate command for controlling the fuel flow rate supplied to the combustor 2 based on this input signal. The state quantity relating to the operating conditions may include, for example, the output of the power generator 4 and the revolution speed or the number of revolutions of the gas turbine 3. In addition, the state quantity relating to the temperature conditions may include, for example, the exhaust gas temperature and the blade path temperature.

The computing portion 19 of this embodiment is formed, for example, of a load controller 11, a governor controller 12, a temperature controller 13, and a first selection circuit 14.

The load controller 11 obtains a power generator output, a purchased-power control value, and the like as input signals and computes a load control signal for controlling the fuel flow rate so that the power generator output coincides with a target value. Hereinafter, this load control signal is called LDCSO. For example, the load controller 11 compares the power generator output with the target output, performs a proportional-plus-integral (PI) computation, and then outputs the result thereof as LDCSO.

The governor controller 12 obtains the revolution speed or the number of revolutions of the gas turbine 3 as an input signal and calculates a governor control signal for controlling the fuel flow rate so that the revolution speed or the number of revolutions of the gas turbine 3 coincides with a target value. Hereinafter, this governor control signal is called GVCSO. For example, the governor controller 12 compares the revolution speed of the gas turbine 3, that is, the revolution speed of the power generator 4, with a predetermined GV set value and outputs a proportional (P) control signal as GVCSO.

The temperature controller 13 has a blade-path-temperature controller (not shown) and an exhaust-gas-temperature controller (not shown). The blade-path-temperature controller obtains the blade path temperature BPT of the gas turbine 3 as an input signal and calculates a blade-path-temperature control signal for controlling the fuel flow rate so that this blade path temperature BPT does not exceed a blade-path-temperature upper limit. Hereinafter, this blade-path-temperature signal is called BPCSO. For example, the blade-path-temperature controller compares the blade path temperature with a blade-path-temperature set value, performs a proportional-plus-integral (PI) computation, and outputs the result thereof as BPCSO.

The exhaust-gas-temperature controller obtains an exhaust gas temperature EXT as an input signal and calculates an exhaust-gas-temperature control signal for controlling the fuel flow rate so that this exhaust gas temperature EXT does not exceed an exhaust-gas-temperature upper limit. Hereinafter, this exhaust-gas-temperature signal is called EXCSO. For example, the exhaust-gas-temperature controller compares the exhaust gas temperature with an exhaust-gas-temperature set value, performs a proportional-plus-integral (PI) computation, and outputs the result thereof as EXCSO.

Figure 2:
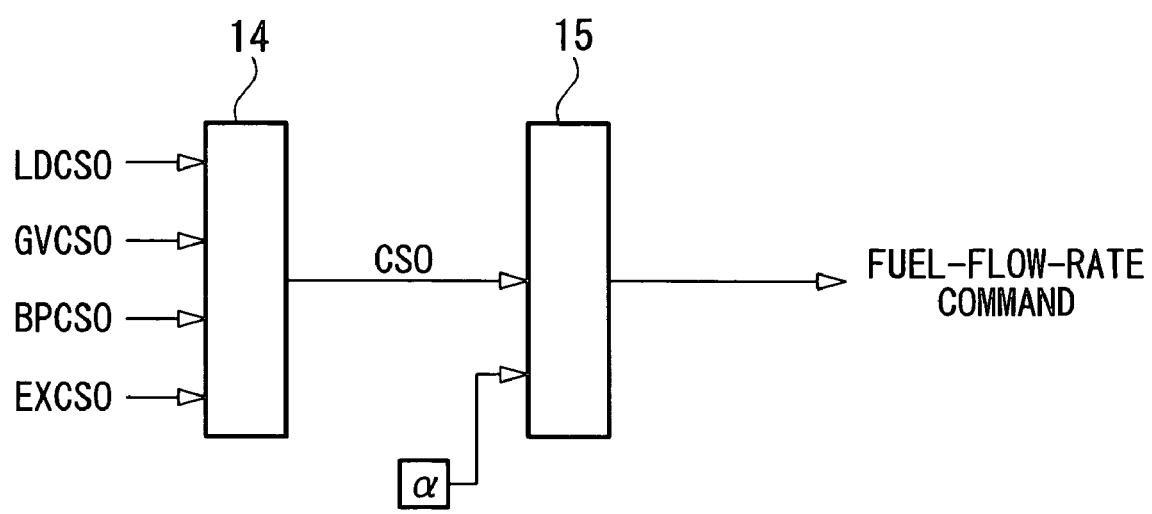
FIG. 2 is a view showing a part of the configuration of a fuel-flow-rate control device according to the first embodiment of the present invention.

LDCSO calculated by the above load controller 11, GVCSO calculated by the governor controller 12, and BPCSO and EXCSO calculated by the temperature controller 13 are transmitted to the first selection circuit 14, as shown in FIGS. 1 and 2. The first selection circuit 14 selects a control signal having the lowest value among the various control signals mentioned above and then outputs it to the second selection circuit 15 as a fuel-flow-rate command CSO.

The second selection circuit 15 has a fuel-flow-rate upper limit α as shown in FIG. 2 and controls the fuel-flow-rate command CSO so as not to exceed the fuel-flow-rate upper limit α. In particular, when the fuel-flow-rate command CSO transmitted from the first selection circuit 14 is not more than the fuel-flow-rate upper limit α, the fuel-flow-rate command CSO is output as a final command value; on the other hand, when the fuel-flow-rate command CSO transmitted from the first selection circuit 14 is more than the fuel-flow-rate upper limit α, the fuel-flow-rate upper limit α is output as a final command value. In this case, for example, the fuel-flow-rate upper limit α is set to a fuel flow rate at which the inlet temperature of the gas turbine 3 is set so as to be not more than a predetermined upper temperature limit. A limiter circuit, for example, may be used as the second selection circuit 15.

The fuel-flow-rate command thus obtained by the fuel-flow-rate control device 20 is transmitted to the fuel-flow-rate regulating valve 5 shown in FIG. 1, as described above, and the opening of the fuel-flow-rate control valve 5 is regulated based on the above fuel-flow-rate command, so that an optimal fuel flow rate is supplied to the combustor 2.

As described above, according to the power generation system of this embodiment, since the second selection circuit 15 which controls the fuel-flow-rate command set based on the state quantity relating the operating conditions and the temperature conditions of the gas turbine so as not to exceed the fuel-flow-rate upper limit is provided, the fuel flow rate supplied to the combustor 2 can always be set so as not to exceed the fuel-flow-rate upper limit. In this embodiment, since the fuel-flow-rate upper limit is set to the fuel flow rate at which the inlet temperature of the gas turbine 3 is set so as not to exceed the predetermined upper temperature limit, the inlet temperature of the gas turbine 3 can always be maintained at not more than the upper temperature limit. Accordingly, overshooting of the inlet temperature of the gas turbine 3 can be prevented.

FIGS. 3 to 6 are graphs showing the changes in fuel-flow-rate command, gas turbine output, fuel-flow-rate command, and gas turbine inlet temperature, respectively, obtained when the power generator output is decreased from approximately 100% to 50% and is then increased again toward 100% in a power generation system of the related art.

In addition, FIGS. 7 to 10 are graphs showing the changes in fuel-flow-rate command, gas turbine output, fuel-flow-rate command, and gas turbine inlet temperature, respectively, obtained when the power generator output is decreased from approximately 100% to 50% and is then increased again toward 100% in the power generation system of this embodiment.

Figure 11:
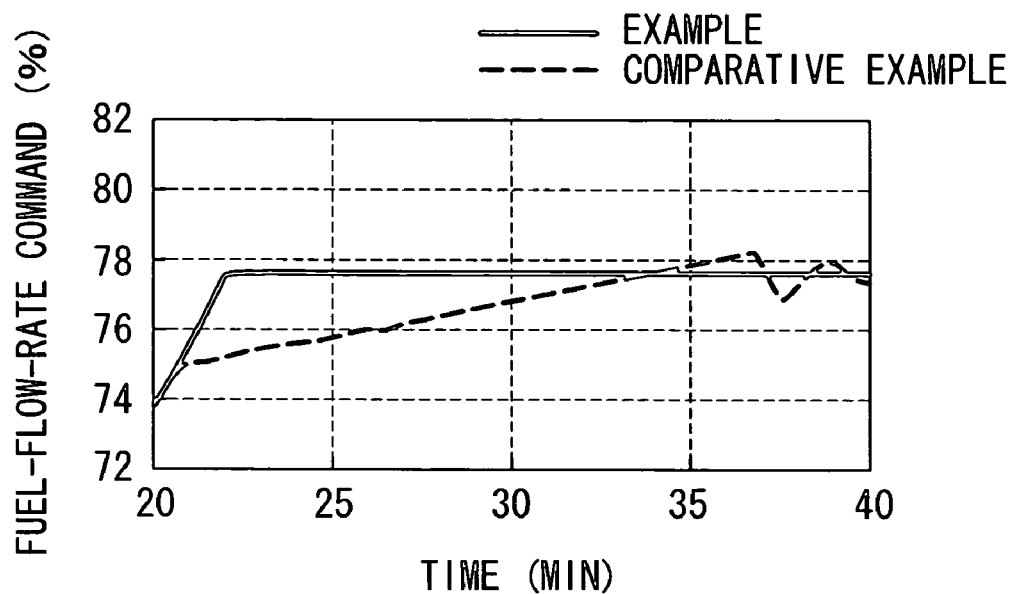
FIG. 11 is a graph showing the changes in fuel-flow-rate command obtained, for comparison purposes, when the power generator output is decreased from approximately 100% to 50% and is then increased again toward 100% in the power generation system of the related art and in the power generation system according to the first embodiment of the present invention.
Figure 12:
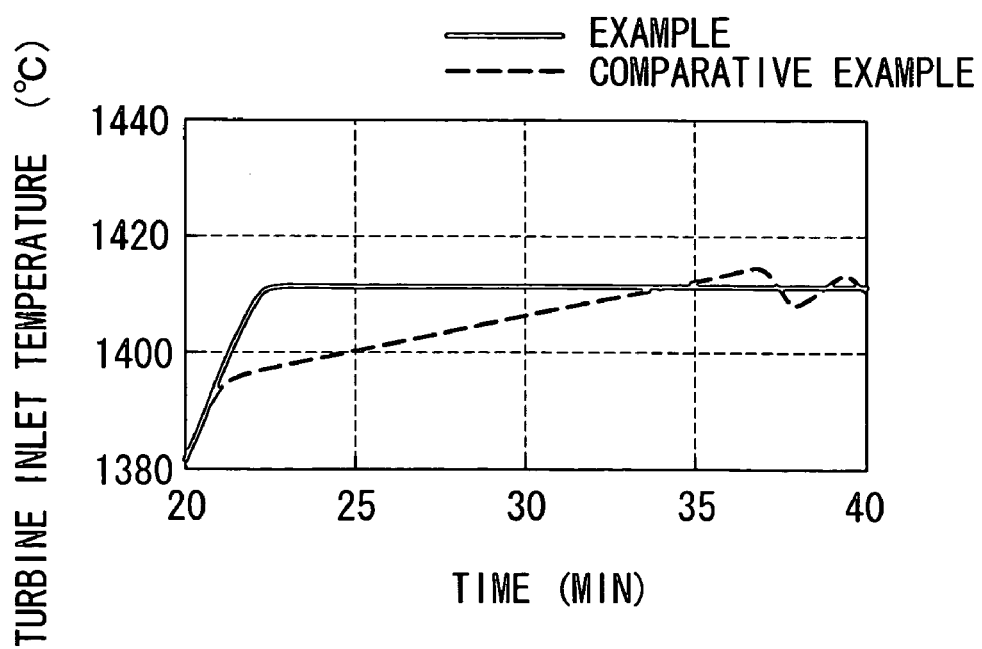
FIG. 12 is a graph showing the changes in turbine inlet temperature obtained, for comparison purposes, when the power generator output is decreased from approximately 100% to 50% and is then increased again toward 100% in the power generation system of the related art and in the power generation system according to the first embodiment of the present invention.

Furthermore, FIG. 11 is a graph showing the change in fuel-flow-rate command of the power generation system of the related art and that of the power generation system of this embodiment for comparison purposes, the changes being obtained when the power generator output is decreased from approximately 100% to 50% and is then increased again toward 100%. FIG. 12 is a graph showing the change in turbine inlet temperature of the power generation system of the related art and that of the power generation system of this embodiment for comparison purposes, the changes being obtained when the power generator output is decreased from approximately 100% to 50% and is then increased again toward 100%.

Figure 3:
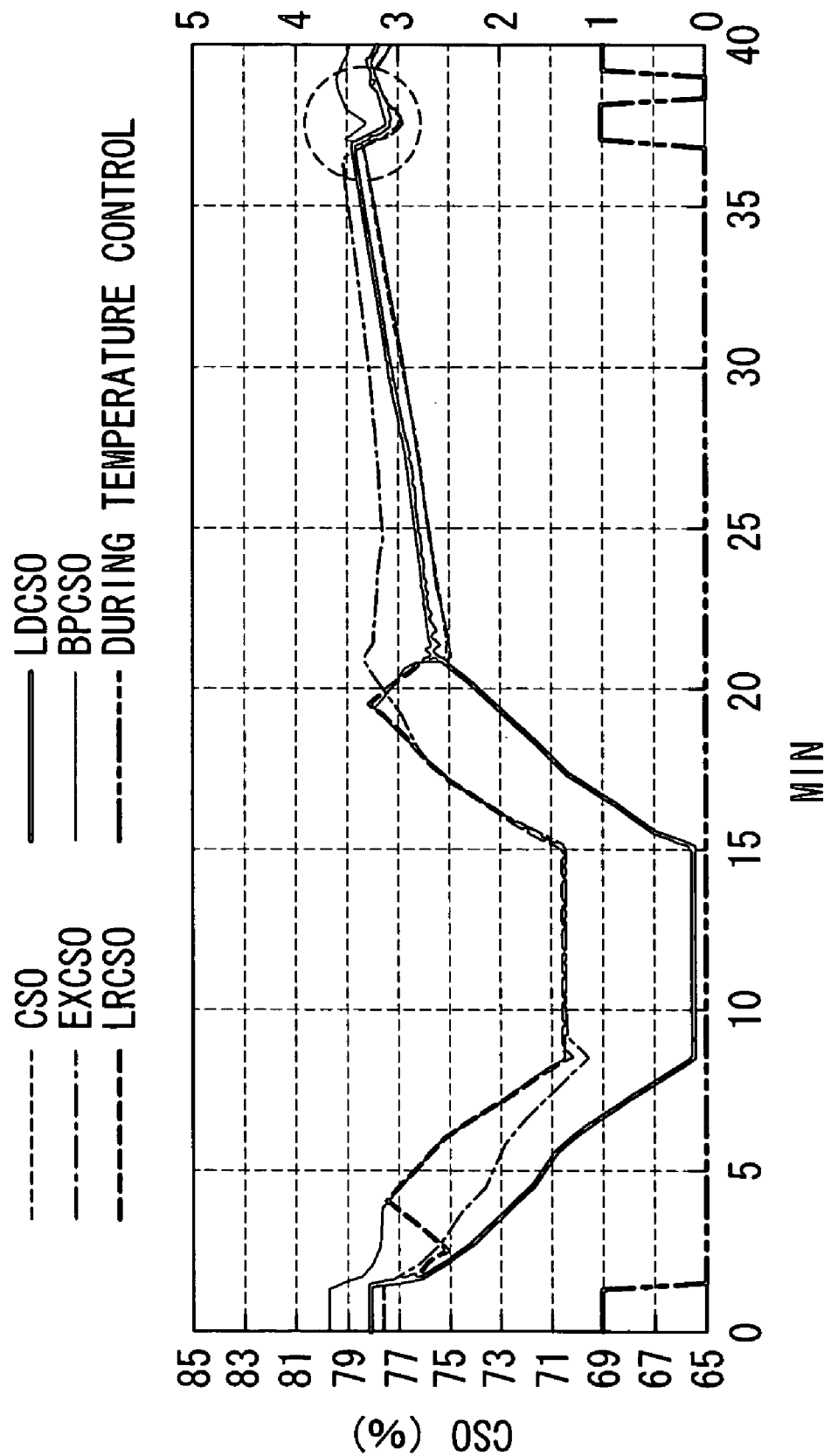
FIG. 3 is a graph showing the change in fuel-flow-rate command obtained when the power generation efficiency is decreased from approximately 100% to 50% and is then increased again toward 100% in a power generation system of the related art.
Figure 4:
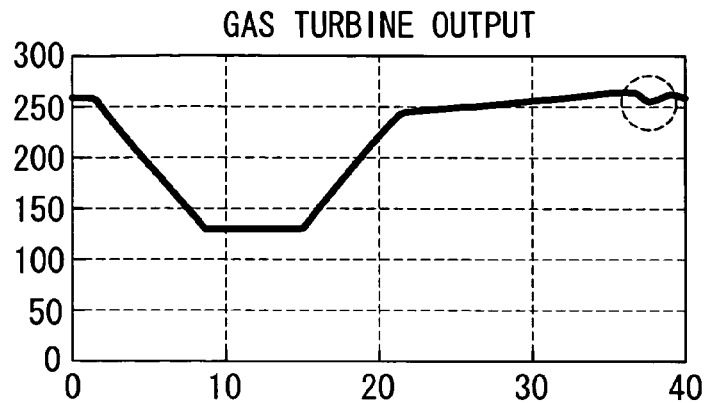
FIG. 4 is a graph showing the change in gas turbine output obtained when the power generator output is decreased from approximately 100% to 50% and is then increased again toward 100% in the power generation system of the related art.
Figure 5:
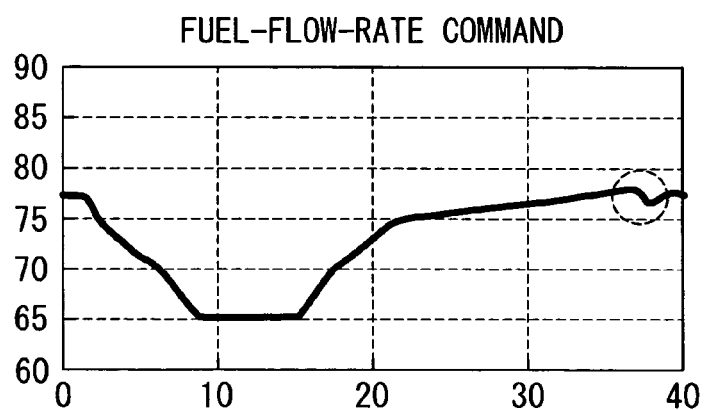
FIG. 5 is a graph showing the change in fuel-flow-rate command obtained when the power generator output is decreased from approximately 100% to 50% and is then increased again toward 100% in the power generation system of the related art.
Figure 6:
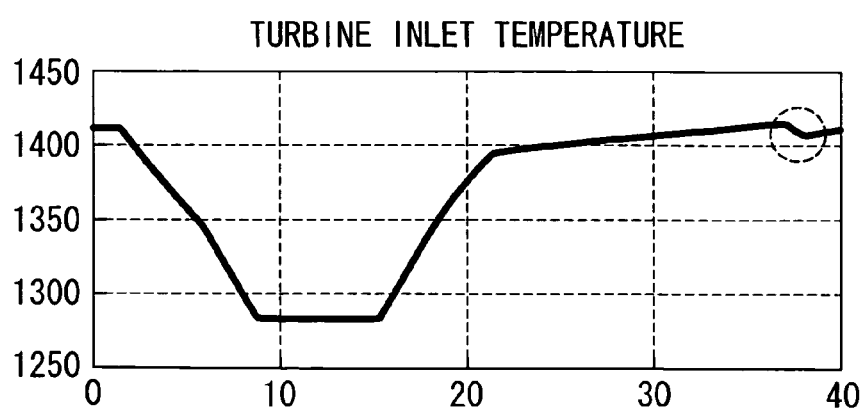
FIG. 6 is a graph showing the change in turbine inlet temperature obtained when the power generator output is decreased from approximately 100% to 50% and is then increased again toward 100% in the power generation system of the related art.

In the power generation system of the related art, since the fuel-flow-rate command is set as shown in FIGS. 3 and 5, overshooting (portion enclosed by a circle in the figure) occurs in the vicinity of a base load (rated output point) of the power generator output, as shown in FIG. 4, and in addition, as shown in FIG. 6, overshooting of the inlet temperature of the gas turbine occurs.

Figure 7:
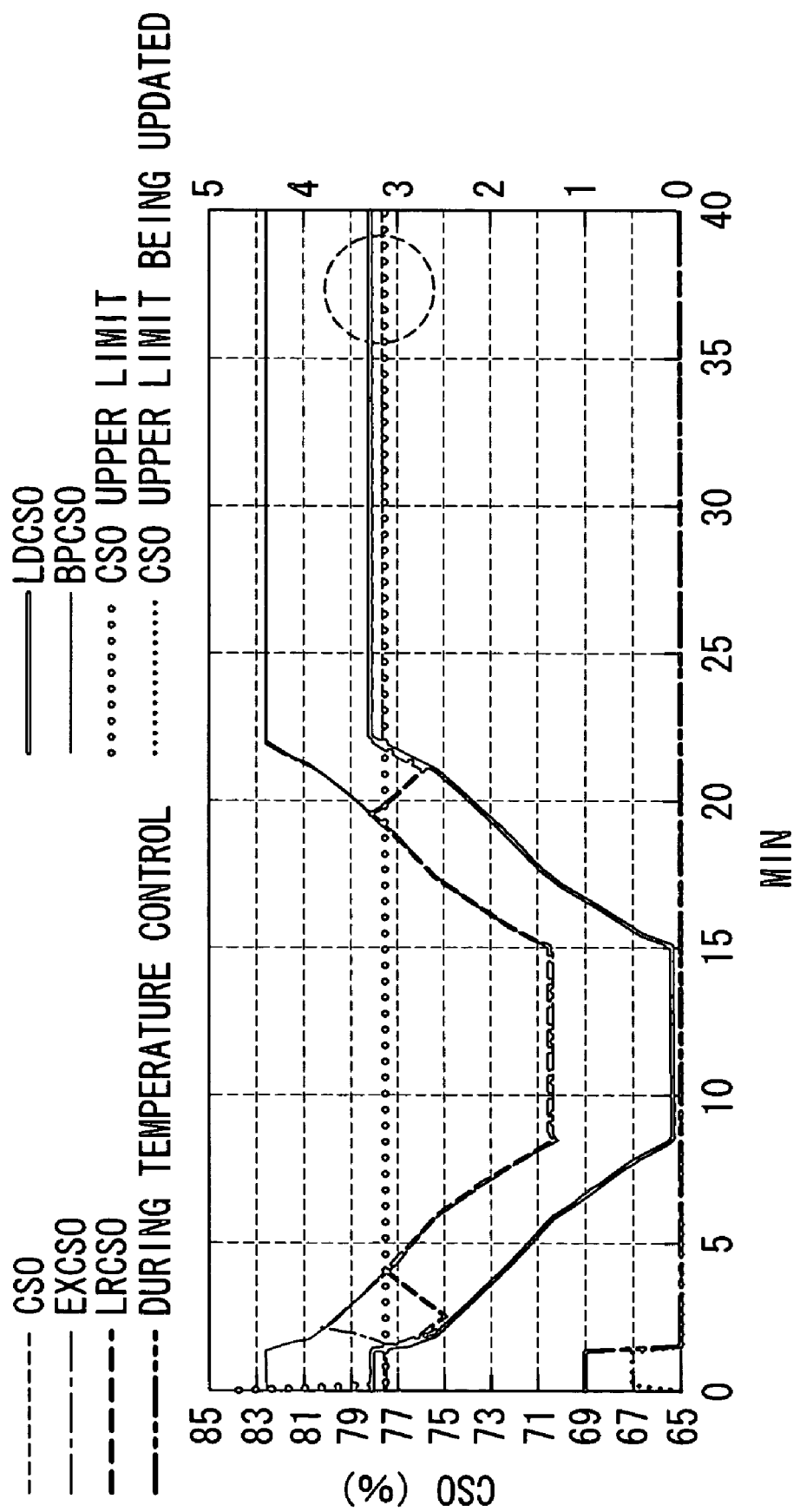
FIG. 7 is a graph showing the change in fuel-flow-rate command obtained when the power generator output is decreased from approximately 100% to 50% and is then increased again toward 100% in a power generation system according to the first embodiment of the present invention.
Figure 8:
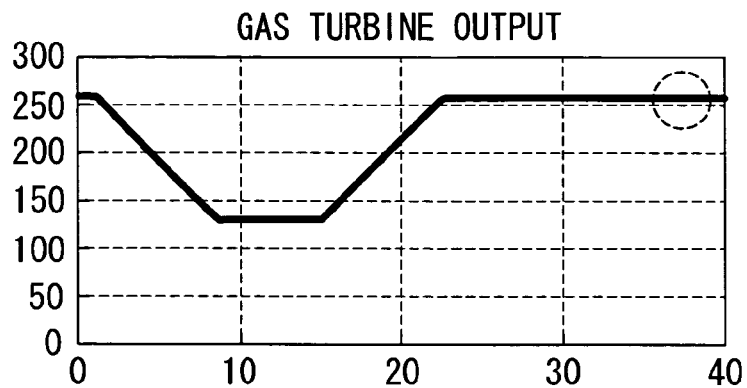
FIG. 8 is a graph showing the change in gas turbine output obtained when the power generator output is decreased from approximately 100% to 50% and is then increased again toward 100% in the power generation system according to the first embodiment of the present invention.
Figure 9:
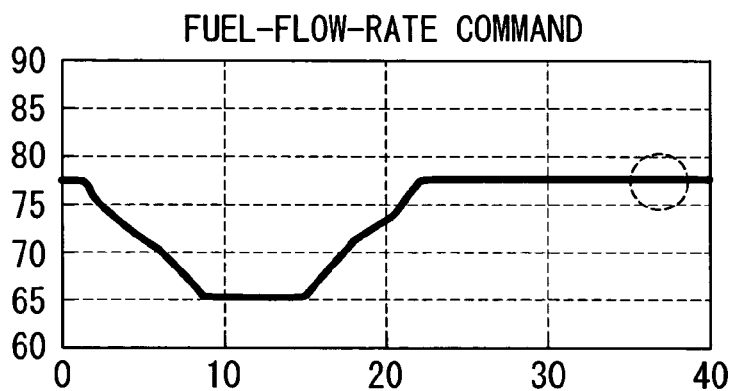
FIG. 9 is a graph showing the change in fuel-flow-rate command obtained when the power generator output is decreased from approximately 100% to 50% and is then increased again toward 100% in the power generation system according to the first embodiment of the present invention.
Figure 10:
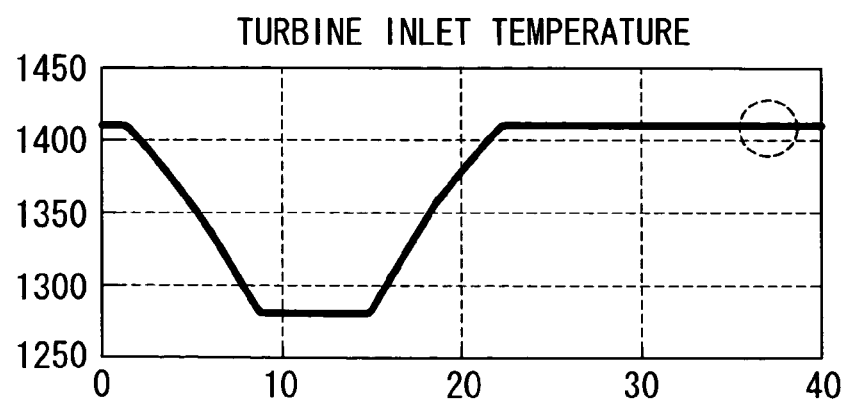
FIG. 10 is a graph showing the change in turbine inlet temperature obtained when the power generator output is decreased from approximately 100% to 50% and is then increased again toward 100% in the power generation system according to the first embodiment of the present invention.

On the other hand, in the power generation system according to this embodiment, as shown in FIGS. 7 to 9, since the fuel-flow-rate command is suppressed so as not to exceed the fuel-flow-rate upper limit, no overshooting of the gas turbine output occurs, as shown in FIG. 8, and in addition, as shown in FIG. 10, no overshooting of the turbine inlet temperature occurs either.

In addition, as shown by the dotted line in FIG. 11, since the fuel-flow-rate command is moderately increased at a predetermined rate in the power generation system of the related art, the increase in turbine inlet temperature is moderate, as shown by the dotted line in FIG. 12. Accordingly, it takes a long period of time for the turbine inlet temperature to reach the vicinity of the upper temperature limit, and hence, during this long period of time, the power generation efficiency is decreased.

On the other hand, in the power generation system according to this embodiment, as shown by the solid line in FIG. 11, since the fuel-flow-rate command can be increased to the fuel-flow-rate upper limit in a short period of time, as shown by the solid line in FIG. 12, the turbine inlet temperature can be increased to the vicinity of the upper temperature limit in a short period of time. Hence, the starting time can be shortened, and the power generation efficiency can also be improved.

Second Embodiment

Next, a power generation system according to a second embodiment of the present invention will be described. The difference between the power generation system of this embodiment and that of the first embodiment is that the fuel-flow-rate control device further includes a correction circuit 16a which corrects the fuel-flow-rate upper limit α in accordance with the valve opening of the IGV regulating valve 6, and by using a fuel-flow-rate upper limit α1 obtained by correction using this correction circuit 16a, low-value control is carried out by the second selection circuit 15.

Hereinafter, the fuel-flow-rate control device of this embodiment will be described only in terms of differences from the first embodiment, and a description of similarities will be omitted.

Figure 13:
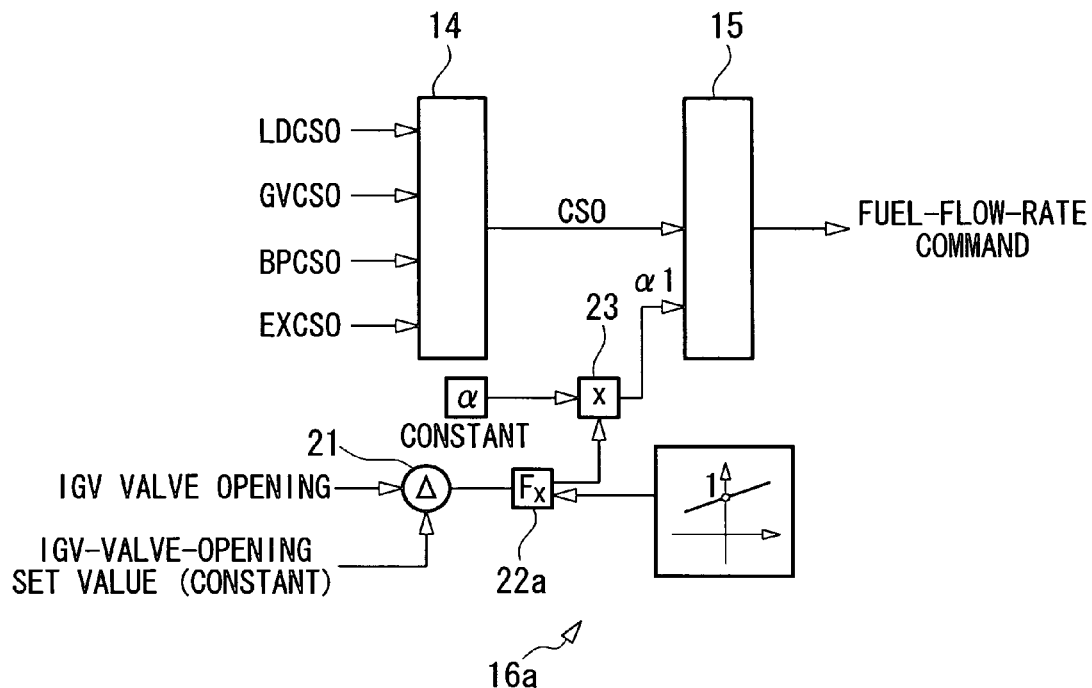
FIG. 13 is a view partly showing the configuration of a fuel-flow-rate control device according to a second embodiment of the present invention.

As shown in FIG. 13, the correction circuit 16a includes a subtracter 21, a function generator 22a, and a multiplier 23. In this correction circuit 16a, the valve opening of the IGV regulating valve 6, in other words, information of the air flow rate supplied to the compressor 1, is input to the subtracter 21. The subtracter 21 obtains the difference between this valve opening and an IGV valve opening set value and outputs it to the function generator 22a. The function generator 22a generates a predetermined correction factor (constant) based on the output signal from the subtracter 21 and outputs it to the subsequent multiplier 23. The multiplier 23 multiplies the predetermined fuel-flow-rate upper limit α by the correction factor output from the function generator 22a and then outputs the fuel-flow-rate upper limit α1 obtained by the correction to the second selection circuit 15.

As a result, in the second selection circuit 15, the low-value control is performed so that CSO selected by the first selection circuit 14 is set to be not more than the corrected fuel-flow-rate upper limit α1, and CSO obtained after the low-value control is output as the fuel-flow-rate command.

The function generator 22a has, for example, a function which is set so that as the air flow rate supplied to the compressor 1 is decreased, the fuel flow rate supplied to the combustor 2 is decreased. The reason for this is that since the inlet temperature of the gas turbine 3 is increased as the air flow rate supplied to the compressor 1 is decreased, this increase in temperature must be suppressed.

As described above, according to the fuel-flow-rate control device of this embodiment, since the fuel-flow-rate upper limit is corrected in accordance with the air flow rate supplied to the compressor 1, the operating conditions can be reflected in the fuel-flow-rate control. Accordingly, the fuel-flow-rate control can be precisely performed, and for example, the power generation efficiency can be improved.

Third Embodiment

Next, a power generation system according to a third embodiment of the present invention will be described. The difference between the power generation system of this embodiment and that of the above second embodiment is that instead of the correction circuit 16a, a correction circuit 16b is provided which corrects the fuel-flow-rate upper limit α in accordance with the ambient temperature.

Hereinafter, the fuel-flow-rate control device of this embodiment will be described only in terms of the differences from the above second embodiment, and a description of similarities will be omitted.

Figure 14:
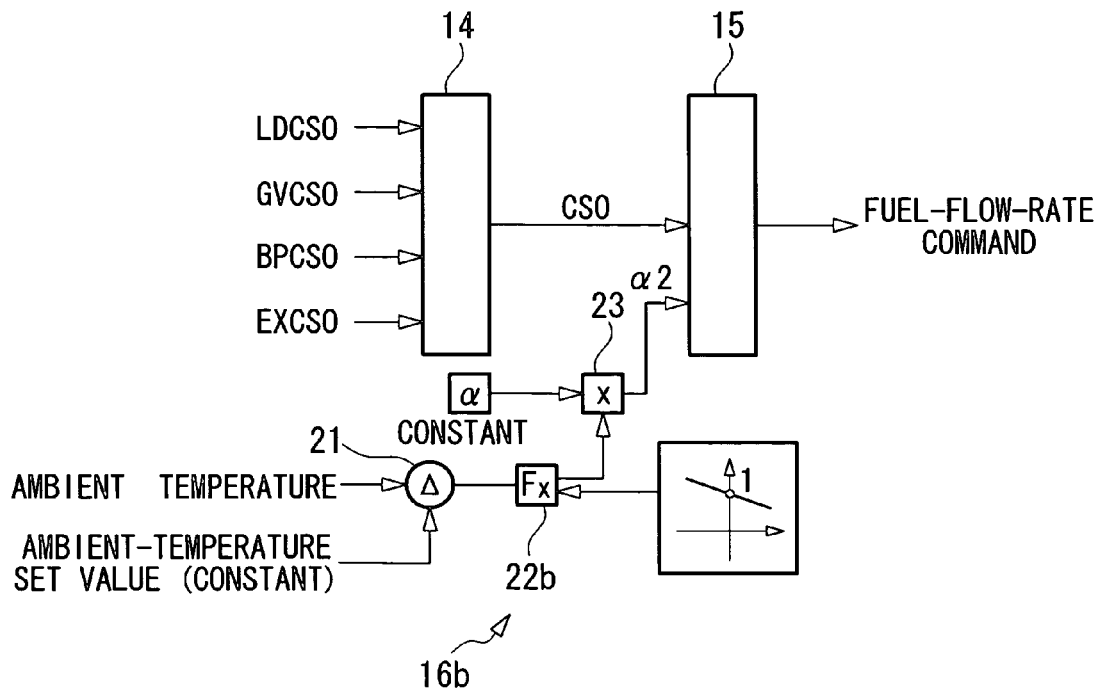
FIG. 14 is a view partly showing the configuration of a fuel-flow-rate control device according to a third embodiment of the present invention.

As shown in FIG. 14, the correction circuit 16b includes the subtracter 21, a function generator 22b, and the multiplier 23. In this correction circuit 16b, information on the ambient temperature, such as the inlet temperature of the compressor 1, is input to the subtracter 21. The subtracter 21 obtains the difference between this ambient temperature and a predetermined ambient temperature set value and outputs it to the function generator 22b. The function generator 22b generates a predetermined correction factor (constant) based on the output signal from the subtracter 21 and outputs it to the subsequent multiplier 23. The multiplier 23 multiplies the predetermined fuel-flow-rate upper limit α by the correction factor output from the function generator 22b and then outputs a fuel-flow-rate upper limit α2 obtained by the correction to the second selection circuit 15.

As a result, in the second selection circuit 15, the low-value control is performed so that CSO selected by the first selection circuit 14 is set to be not more than the corrected fuel-flow-rate upper limit α2, and CSO after the low-value control is output as the fuel-flow-rate command.

The function generator 22b has, for example, a function which is set so that as the ambient temperature is increased, the fuel flow rate supplied to the combustor 2 is decreased. The reason for this is that when the ambient temperature is increased, the air density is decreased, and the air flow rate passing through the compressor is decreased, so that the inlet temperature of the gas turbine 3 is increased. Hence, this increase in temperature must be suppressed.

As described above, according to the fuel-flow-rate control device of this embodiment, since the fuel-flow-rate upper limit is corrected in accordance with the ambient temperature, the fuel-flow-rate control can be precisely performed, and for example, the power generation efficiency can be further improved.

Fourth Embodiment

Next, a power generation system according to a fourth embodiment of the present invention will be described. The difference between the power generation system of this embodiment and that of the above second embodiment is that instead of the correction circuit 16a, a correction circuit 16c is provided which corrects the fuel-flow-rate upper limit α in accordance with the temperature of fuel gas supplied to the combustor 2 (see FIG. 1).

Hereinafter, the fuel-flow-rate control device of this embodiment will be described only in terms of the differences from the above second embodiment, and a description of similarities will be omitted.

Figure 15:
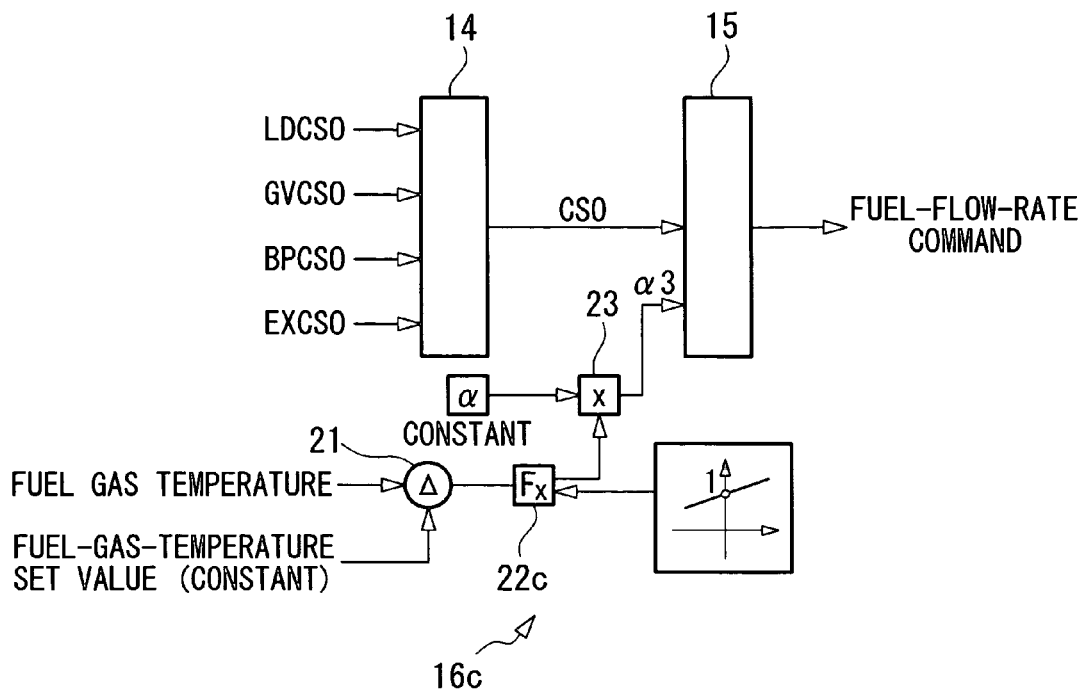
FIG. 15 is a view partly showing the configuration of a fuel-flow-rate control device according to a fourth embodiment of the present invention.

As shown in FIG. 15, the correction circuit 16c includes the subtracter 21, a function generator 22c, and the multiplier 23.

In this correction circuit 16c, the fuel gas temperature is input to the subtracter 21. The subtracter 21 obtains the difference between this fuel gas temperature and a predetermined fuel gas temperature set value and outputs it to the function generator 22c. The function generator 22c generates a predetermined correction factor (constant) based on the output signal from the subtracter 21 and outputs it to the subsequent multiplier 23. The multiplier 23 multiplies the predetermined fuel-flow-rate upper limit α by the correction factor output from the function generator 22c and then outputs a fuel-flow-rate upper limit α3 obtained by the correction to the second selection circuit 15.

As a result, in the second selection circuit 15, the low-value control is performed so that CSO selected by the first selection circuit 14 is set to be not more than the corrected fuel-flow-rate upper limit α3, and CSO after the low-value control is output as the fuel-flow-rate command.

The function generator 22c has, for example, a function which is set so that as the fuel gas temperature is decreased, the fuel flow rate supplied to the combustor 2 is decreased. The reason for this is that when the fuel gas temperature is low, the fuel gas is likely to be supplied to the combustor 2, and the temperature inside the combustor 2 is increased, so that the inlet temperature of the gas turbine 3 is increased. Hence, this increase in temperature must be suppressed.

As described above, according to the fuel-flow-rate control device of this embodiment, since the fuel-flow-rate upper limit is corrected in accordance with the fuel gas temperature, the fuel-flow-rate control can be precisely performed, and for example, the power generation efficiency can be further improved.

Figure 16:
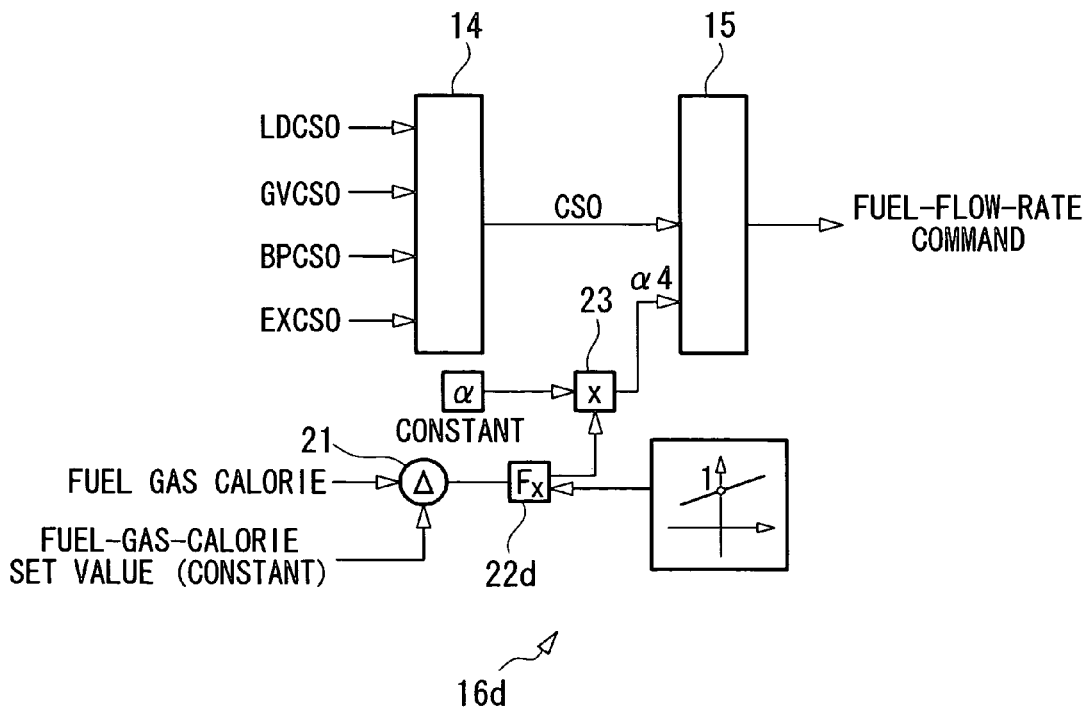
FIG. 16 is a view showing a modification of the fuel-flow-rate control device according to the fourth embodiment of the present invention.

In addition, after the correction factor is obtained from the calorific value (calorie) of the fuel gas, as shown in FIG. 16, instead of the fuel gas temperature, the low-value control may be performed by the second selection circuit 15 using a fuel-flow-rate upper limit α4 corrected by the above correction factor. In this case, unlike the function generator 22c, a function generator 22d has a function which is set so that as the calorific value of the fuel gas is increased, the fuel flow rate supplied to the combustor 2 is decreased.

Fifth Embodiment

Next, a power generation system according to a fifth embodiment of the present invention will be described. The difference between the power generation system of this embodiment and that of the above second embodiment is that instead of the correction circuit 16a, a setting circuit 17a is provided as shown in FIG. 17.

Hereinafter, the fuel-flow-rate control device of this embodiment will be described only in terms of differences from the above second embodiment, and a description of similarities will be omitted.

Figure 17:
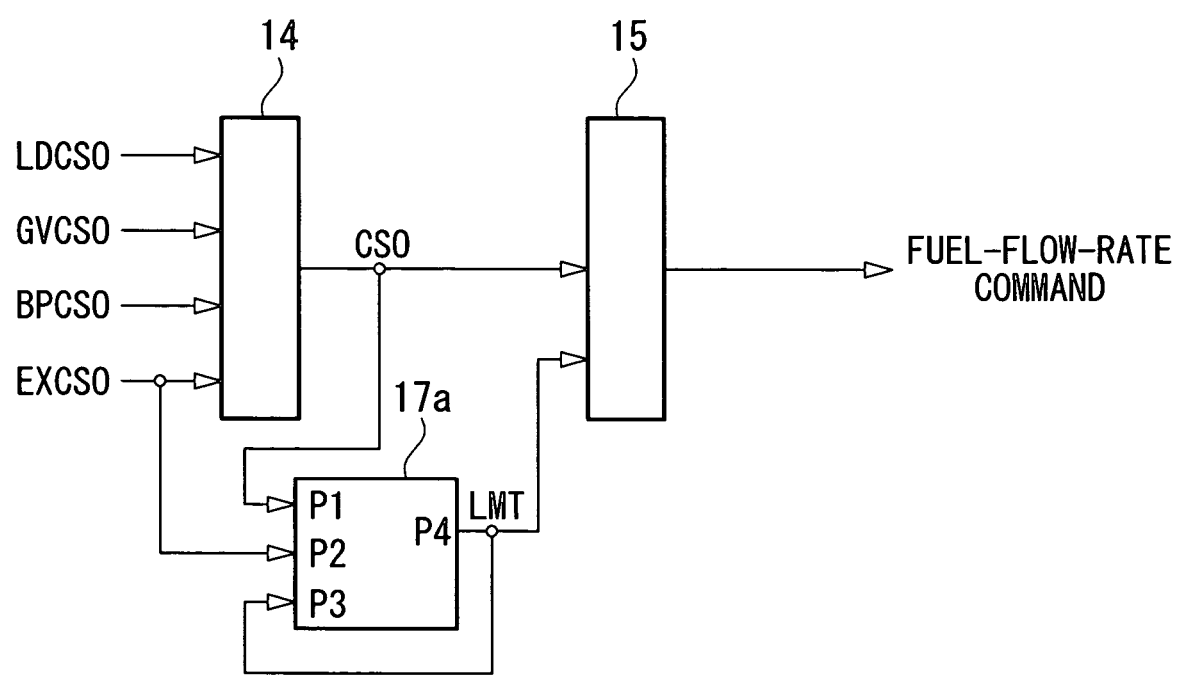
FIG. 17 is a view partly showing the configuration of a fuel-flow-rate control device according to a fifth embodiment of the present invention.

As shown in FIG. 17, in the setting circuit 17a of this embodiment, three input terminals P1, P2, and P3 and one output terminal P4 are provided.

A fuel-flow-rate upper limit LMT set by the setting circuit 17a is output from the output terminal P4. This fuel-flow-rate upper limit LMT is supplied to the second selection circuit 15 and is also fed back to the input terminal P3.

CSO selected by the first selection circuit 14 is input to the input terminal P1, and EXCSO is input to the input terminal P2.

Figure 18:
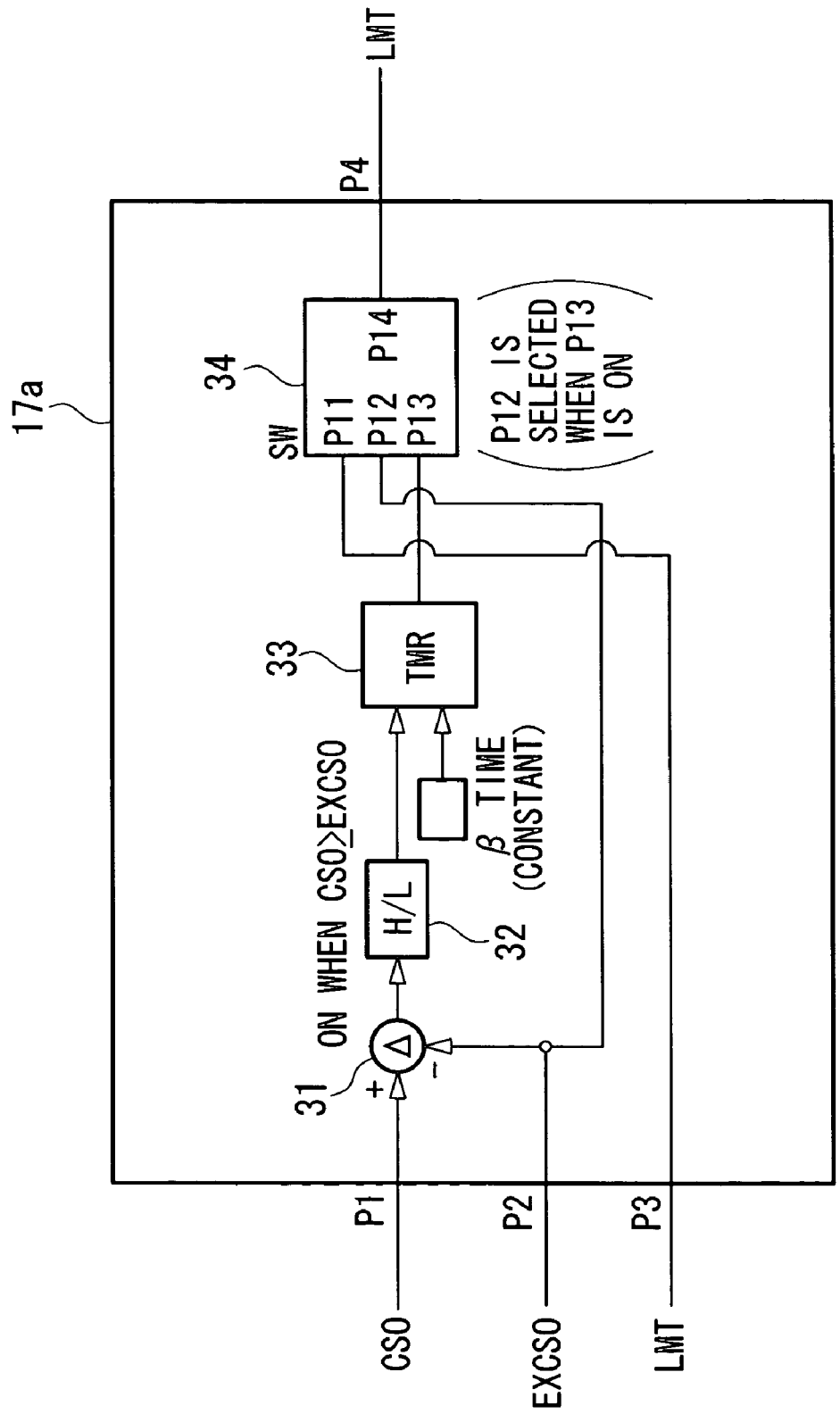
FIG. 18 is a view showing the internal configuration of a setting circuit according to the fifth embodiment of the present invention.

The setting circuit 17a has a subtracter 31, a deviation monitor 32, an on-delay timer 33, and a switching circuit 34, as shown in FIG. 18.

CSO selected by the first selection circuit 14 and EXCSO are input to the subtracter 31. The subtracter 31 calculates CSO−EXCSO and outputs the calculation result to the deviation monitor 32. When the calculation result is 0 or more, that is, when CSO is not less than EXCSO, the deviation monitor 32 outputs an ON signal to the on-delay timer 33. On the other hand, when the input signal is less than 0, that is, when CSO is less than EXCSO, the deviation monitor 32 outputs an OFF signal to the on-delay timer 33. When an ON signal is input to the on-delay timer 33, after a predetermined time β from the input of the input signal, the on-delay timer 33 outputs an ON signal to the switching circuit 34. In addition, when an OFF signal is input to the on-delay timer 33, the on-delay timer 33 outputs an OFF signal to the switching circuit 34 without any delay.

The switching circuit 34 has three input terminals P11 to P13 and one output terminal P14. The fuel-flow-rate upper limit LTM is input to the input terminal P11 via the input terminal P3 of the setting circuit 17a. EXCSO is input to the input terminal P12. A signal from the on-delay timer 33 is input to the input terminal P13.

When the signal input to the input terminal P13 from the on-delay timer 33 is an ON signal, EXCSO input to the input terminal P12 is output from the output terminal P14 of the switching circuit 34. On the other hand, when the signal input to the input terminal P13 is an OFF signal, the signal input to the input terminal P11 is output from the output terminal P14.

The signal output from the output terminal P14 of the switching circuit 34 is supplied as the fuel-flow-rate upper limit LMT to the second selection circuit 15 via the output terminal P4 of the setting circuit 17a and is also fed back to the input terminal P3 of the setting circuit 17a.

The second selection circuit 15 performs the low-value control so that CSO selected by the first selection circuit 14 is set to be not more than the fuel-flow-rate upper limit LMT and then outputs CSO after the low-value control as the fuel-flow-rate command.

According to the setting circuit 17a, as described above, when the state in which CSO is not less than EXCSO, that is, when the state in which EXCSO is selected as CSO by the first selection circuit 14, lasts for a predetermined time β, the fuel-flow-rate upper limit LMT is updated so as to coincide with EXCSO. On the other hand, when a control signal other than EXCSO is selected as CSO by the first selection circuit 14, a fuel-flow-rate upper limit LMT that is set at this selection and switchover of the control signal of CSO is maintained. Furthermore, when EXCSO is again selected as CSO by the first selection circuit 14, and when this state lasts for a predetermined time β, the fuel-flow-rate upper limit LMT is updated from the value which has been maintained at the present value of EXCSO, and subsequently, until the selection and switchover of CSO described above occurs, the fuel-flow-rate upper limit LMT is updated so as to coincide with the value of EXCSO.

As described above, according to the fuel-flow-rate control device of this embodiment, since the setting circuit 17a is provided for determining the fuel-flow-rate upper limit LMT based on the behaviors of LDCSO, GVCSO, BPCSO, and EXCSO calculated by the computing portion 19, an optimal fuel-flow-rate upper limit LMT can be set in accordance with the state of the power generation system. Consequently, while overshooting of the inlet temperature of the gas turbine 3 is prevented, the power generation efficiency can be further improved.

Sixth Embodiment

Next, a power generation system according to a sixth embodiment of the present invention will be described. The difference between the power generation system of this embodiment and that of the above fifth embodiment is that instead of the setting circuit 17a, a setting circuit 17b is provided.

Hereinafter, the fuel-flow-rate control device of this embodiment will be described only in terms of the differences from the above fifth embodiment, and a description of similarities will be omitted.

Figure 19:
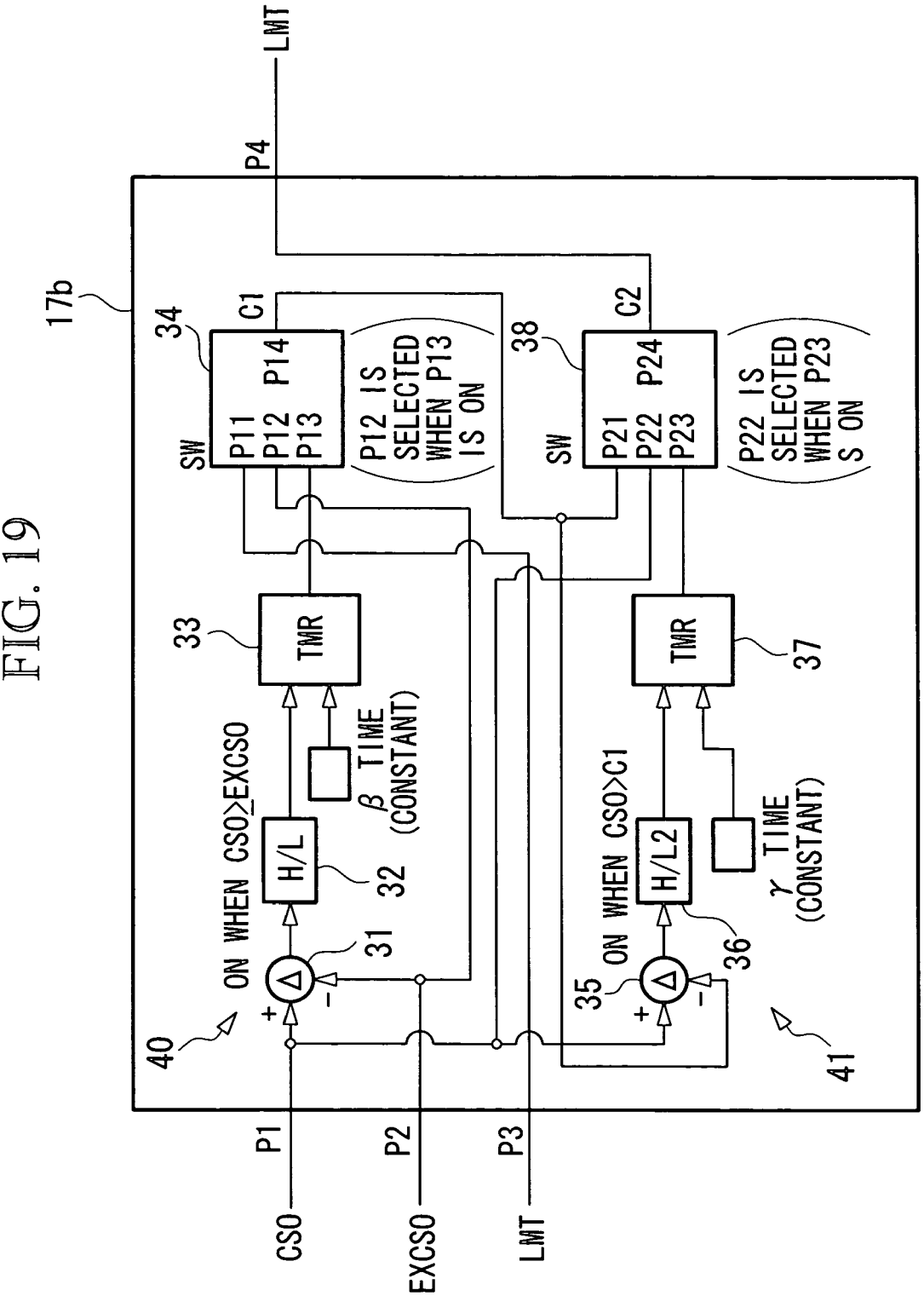
FIG. 19 is a view showing the internal configuration of a setting circuit according to a sixth embodiment of the present invention.

As shown in FIG. 19, in the setting circuit 17b of this embodiment, as is the case of the setting circuit 17a, the three input terminals P1, P2, and P3 and the output terminal P4 are provided.

A fuel-flow-rate upper limit LMT set by the setting circuit 17b is output from the output terminal P4. This fuel-flow-rate upper limit LMT is supplied to the second selection circuit 15 (see FIG. 17) and is also fed back to the input terminal P3.

CSO selected by the first selection circuit 14 (see FIG. 17) is input to the input terminal P1, and EXCSO is input to the input terminal P2.

The setting circuit 17b has a first upper-limit setting circuit 40 and a second upper-limit setting circuit 41.

The first upper-limit setting circuit 40 has the subtracter 31, the deviation monitor 32, the on-delay timer 33, and the switching circuit 34. The operation of this first upper-limit setting circuit 40 is approximately equivalent to that of the setting circuit 17a of the above fifth embodiment.

The second upper-limit setting circuit 41 has a subtracter 35, a deviation monitor 36, an on-delay timer 37, and a switching circuit 38.

In the first upper-limit setting circuit 40, CSO selected by the first selection circuit 14 and EXCSO are input to the subtracter 31. The subtracter 31 calculates CSO−EXCSO and outputs the calculation result to the deviation monitor 32. When the calculation result is 0 or more, that is, when CSO is not less than EXCSO, the deviation monitor 32 outputs an ON signal to the on-delay timer 33. On the other hand, when the input signal is less than 0, that is, when CSO is less than EXCSO, the deviation monitor 32 outputs an OFF signal to the on-delay timer 33. When an ON signal is input to the on-delay timer 33, after a predetermined time β from the input of the input signal, the on-delay timer 33 outputs an ON signal to the switching circuit 34. In addition, when an OFF signal is input to the on-delay timer 33, the on-delay timer 33 outputs an OFF signal to the switching circuit 34 without any delay.

The switching circuit 34 has the three input terminals P11 to P13 and the output terminal P14. The present fuel-flow-rate upper limit LMT is input to the input terminal P11 via the input terminal P3 of the setting circuit 17b. EXCSO is input to the input terminal P12. The signal from the on-delay timer 33 is input to the input terminal P13.

When the signal input to the input terminal P13 from the on-delay timer 33 is an ON signal, EXCSO input to the input terminal P12 is output as a signal C1 from the output terminal P14 of the switching circuit 34. On the other hand, when the signal input to the input terminal P13 is an OFF signal, the signal input to the input terminal P11, that is, the present fuel-flow-rate upper limit LMT, is output from the output terminal P14 as the signal C1.

The signal C1 output from the output terminal P14 of the switching circuit 34 is input to the subtracter 35 of the second upper-limit setting circuit 41 and an input terminal P21 of the switching circuit 38. In the second upper-limit setting circuit 41, the subtracter 35 calculates CSO−C1 and outputs the calculation result to the deviation monitor 36. When the input signal is more than 0, that is, when CSO is more than C1, the deviation monitor 36 outputs an ON signal to the on-delay timer 37. On the other hand, when the input signal is not more than 0, that is, when COS is not more than C1, the deviation monitor 36 outputs an OFF signal to the on-delay timer 37. When an ON signal is input to the on-delay timer 37, after a predetermined time Y from the input of the input signal, the on-delay timer 37 outputs an ON signal to the switching circuit 38. In addition, when an OFF signal is input to the on-delay timer 37, the on-delay timer 37 outputs an OFF signal to the switching circuit 38 without any delay.

The switching circuit 38 has three input terminals P21 to P23 and one output terminal P24. The signal C1 output from the switching circuit 34 of the first upper-limit setting circuit 40 is input to the input terminal P21. CSO is input to the input terminal P22. The signal from the on-delay timer 37 is input to the input terminal P23.

When the signal input to the input terminal P23 is an ON signal, CSO input to the input terminal P22 is output from the output terminal P24 of the switching circuit 38. On the other hand, when the signal input to the input terminal P23 is an OFF signal, the signal input to the input terminal P21, that is, the signal C1 output from the switching circuit 34 of the first upper-limit setting circuit 40 is output from the output terminal P24.

The signal output from the output terminal P24 is output as the fuel-flow-rate upper limit LMT to the second selection circuit 15 via the output terminal P4 of the setting circuit 17b and is also fed back to the input terminal P3 of the setting circuit 17b.

The second selection circuit 15 performs the low-value control so that CSO selected by the first selection circuit 14 is set to be not more than the fuel-flow-rate upper limit LMT, and CSO after the low-value control is output as the fuel-flow-rate command.

Next, the operation of the setting circuit 17b shown in FIG. 19 according to this embodiment will be described with reference to FIG. 20. The way in which the fuel-flow-rate upper limit LMT is determined when the ambient temperature is changed between approximately 25° C. and 5° C. so as to generate a sine wave will be described.

First, since the ambient temperature is relatively high, such as 15° C. or more, while EXCSO is selected as CSO by the first selection circuit 14 (from time T0 to T1), the setting circuit 17b updates the fuel-flow-rate upper limit LMT so as to coincide with EXCSO.

Subsequently, since the ambient temperature gradually decreases, EXCSO rapidly increases at the Time T1 and is no longer selected as CSO by the first selection circuit 14, and then LDCSO is selected as CSO. From FIG. 20, since LDCSO is smaller than EXCSO, the output from the subtracter 31 in the setting circuit 17b shown in FIG. 19 is 0 or less, and the output of the deviation monitor 32 is changed from an ON signal to an OFF signal. Accordingly, this OFF signal is input to the input terminal P13 of the switching circuit 34 from the on-delay timer 33 without any time delay.

The switching circuit 34 outputs the present fuel-flow-rate upper limit LMT input to the input terminal P11 as the signal C1 from the output terminal P14. This signal C1 is input to the subtracter 35 and is also input to the input terminal P21 of the switching circuit 38. In this step, the signal C1 is the value of EXCSO right before the time T1 shown in FIG. 20.

The subtracter 35 outputs the calculation result of CSO−C1 to the deviation monitor 36. In this step, since CSO at the time T1 is LDCSO and is not less than the fuel-flow-rate upper limit LMT right before the time T1, the calculation result is 0 or more, so that an ON signal is output to the on-delay timer 37 from the deviation monitor 36. Accordingly, after the predetermined time Y from the time T1 (see FIG. 20), an ON signal is output to the switching circuit 38 from the on-delay timer 37.

Figure 20:
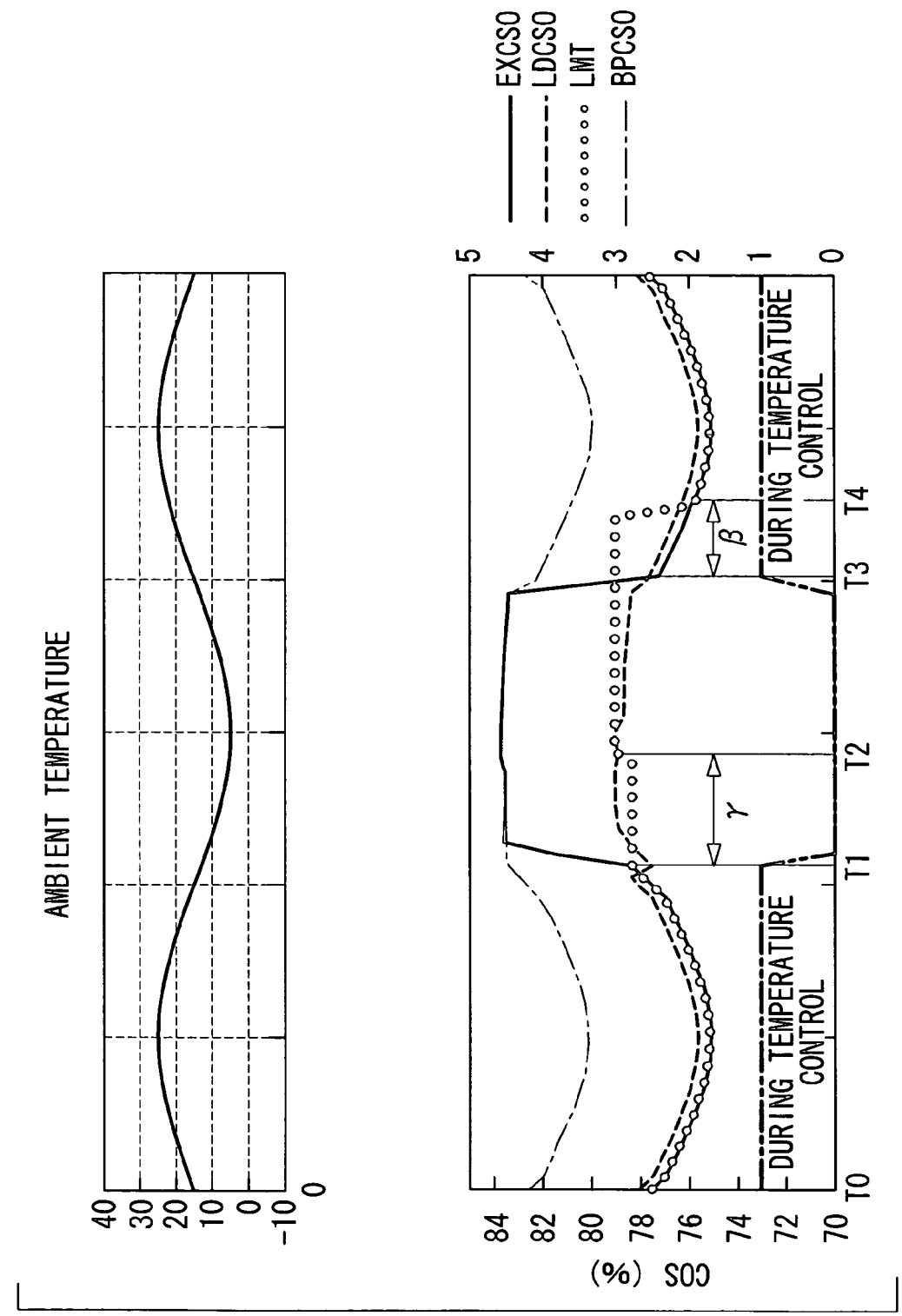
FIG. 20 is a view illustrating the operation of the setting circuit according to the sixth embodiment of the present invention.

Until the predetermined time Y passes, that is, during a period of time from the time T1 to the time T2 shown in FIG. 20, since the OFF signal is being output from the on-delay circuit 37, the signal C1 input to the input terminal P21 is selected in the switching circuit 38 and is then output from the output terminal P24 thereof. This signal C1 is the present fuel-flow-rate upper limit LMT, that is, this signal C1 is EXCSO right before the time T1, and hence from the time T1 to the time T2, EXCSO which is the fuel-flow-rate upper limit LMT right before the time T1 is maintained.

Subsequently, at the time T2 after the predetermined time Y from the time T1, when an ON signal is input to the input terminal P23 of the switching circuit 38 from the on-delay timer 37, the switching circuit 38 selects CSO input to the input terminal P22 and outputs it from the output terminal P24. In this case, since CSO at the time T2 is LDCSO, as shown in FIG. 20, at the time T2, the fuel-flow-rate upper limit LMT is updated to LDCSO.

After the time T2, except for the case in which the output signal from the subtracter 31 becomes 0 or more, and the case in which the output of the deviation monitor 32 is switched over to an ON signal, in the switching circuit 34, LDCSO is output as the signal C1 which is the present fuel-flow-rate upper limit LMT input to the input terminal P11, and also in the switching circuit 38, this signal C1 is selected and is output. Hence, after the time T2, as shown in FIG. 20, LDCSO at the time T2 is maintained as the fuel-flow-rate upper limit LMT.

Subsequently, at a time T3, because of influence of the increase in ambient temperature, the value of EXCSO decreases, and EXCSO is selected as CSO by the first selection circuit 14; hence, the output of the subtracter 31 becomes 0 or more, and an ON signal is output to the on-delay timer 33 from the deviation monitor 32. As a result, after the predetermined time β from the time T3, an ON signal is output from the on-delay timer 33 to the switching circuit 34.

Until the predetermined time β passes, that is, during the time between T3 and T4 shown in FIG. 20, since the OFF signal is being output from the on-delay circuit 33, in the switching circuit 34, the present fuel-flow-rate upper limit LMT input to the input terminal P11 is input as the signal C1 to the switching circuit 38, and also in the switching circuit 38, the fuel-flow-rate upper limit LMT input to the input terminal P21 is selected and is output from the output terminal P24. Accordingly, the present LMT, that is, LDCSO at the time T2, is maintained as the fuel-flow-rate upper limit LMT.

Subsequently, at the time T4 after the predetermined time β from the time T3, when an ON signal is input to the input terminal P13 of the switching circuit 34 from the on-delay timer 33, the switching circuit 34 selects CSO input to the input terminal P12 and outputs it as the signal C1 from the output terminal P14. In this case, CSO at the time T4 is EXCSO, as shown in FIG. 20. This signal C1 is input to the subtracter 35 and the input terminal P21 of the switching circuit 38.

The subtracter 35 calculates CSO−C1 and outputs the calculation result to the deviation monitor 36. In this case, since CSO at the time T4 is EXCSO and C1 is also EXCSO, the calculation result is 0, so that an OFF signal is output to the on-delay timer 37 from the deviation monitor 36. Accordingly, an OFF signal is input to the input terminal P23 of the switching circuit 38 from the on-delay timer 37, and as a result, the signal C1 input to the input terminal P21 is selected and is then output from the output terminal P24. In this case, since the signal C1 at the time T4 is EXCSO, the fuel-flow-rate upper limit LMT is updated to EXCSO at the time T4.

After the time T4, until a control signal other than EXCSO is selected as CSO by the first selection circuit 14, the fuel-flow-rate upper limit LMT is updated so as to coincide with EXCSO.

As has thus been described, according to this embodiment, when the state in which EXCSO is selected as CSO by the first selection circuit 14 lasts for the predetermined time β (time between T3 and T4 in FIG. 20), the fuel-flow-rate upper limit LMT is updated so as to coincide with EXCSO (time between T0 and T1 and after T4 in FIG. 20); in addition, when the signal selected as CSO by the first selection circuit 14 is switched over from EXCSO to another signal (at the time T1 in FIG. 20), the fuel-flow-rate upper limit which is set at this switchover point is maintained, and when this maintained state lasts for the predetermined time Y (time between T1 and T2 in FIG. 20), the fuel-flow-rate upper limit LMT is updated to the present value of CSO.

As described above, when the setting circuit 17b sets the fuel-flow-rate upper limit LMT, the state of the power generation system can be reflected in the control of the fuel flow rate, and hence the fuel-flow-rate upper limit LMT can be set to a more preferable value. Accordingly, for example, the power generation efficiency can be improved.

In addition, FIGS. 21 to 23 show the changes in gas turbine output, fuel-flow-rate command, and turbine inlet temperature in the power generation system of this embodiment which are obtained when the ambient temperature is changed as shown in FIG. 20. As shown in FIG. 22, since the fuel-flow-rate command is selected in accordance with the ambient temperature, overshooting of the gas turbine output and that of the turbine inlet temperature are prevented, and at the same time, the fuel-flow-rate command can be maintained in a region in the vicinity of the upper limit.

The embodiments of the present invention have been described with reference to the figures; however, the particular configurations are not limited to the embodiments described above, and various modification and changes may be made without departing from the spirit and the scope of the present invention.

In the embodiments described above, as the fuel-flow-rate control device, processing using the hardware is primarily described; however, the processing is not necessarily limited to the above configurations. For example, the processing may also be performed by using software based on the individual input signals. In this case, the fuel-flow-rate control device includes main memory devices, such as a CPU and a RAM, and computer-readable recording media in which programs are recorded for realizing part or all of the processing described above. In this fuel-flow-rate control device, when the CPU reads the programs recorded on the above recording media, followed by processing and computing of the information, processing equivalent to that of the above fuel-flow-rate control device can be realized.

The computer-readable recording media include a magnetic disc, an optical magnetic disc, a CD-ROM, a DVD-ROM, and a semiconductor memory. In addition, these computer programs may be supplied to a computer through a communication line, so that the computer receiving these programs may execute the programs.

What is claimed is:

1. A fuel-flow-rate control device for controlling a fuel flow rate supplied to a combustor of a gas turbine including a compressor configured to compress and emit air, the combustor configured to burn a fuel supplied via a fuel pipe together with the compressed air supplied from the compressor and to emit a combustion gas, a turbine to be driven by the combustion gas supplied from the combustor, and a power generator configured to be driven by the turbine, said fuel-flow-rate control device comprising:

a computing portion configured to obtain a state quantity corresponding to operating conditions and temperature conditions of the gas turbine as an input signal, and to compute a fuel-flow-rate command for controlling the fuel flow rate supplied to the combustor; and a regulating portion configured to set the fuel-flow-rate command obtained by said computing portion to be no greater than a fuel-flow-rate upper limit, the fuel-flow-rate upper limit being set to a fuel flow rate at which an inlet temperature of the turbine is set to be not more than a predetermined upper temperature limit;

wherein said computing portion includes:

a load controller configured to calculate a load control signal for controlling the fuel flow rate so that an output of the power generator coincides with a target value;

an exhaust-gas-temperature controller configured to calculate an exhaust-gas-temperature control signal for controlling the fuel flow rate so that an exhaust gas temperature of the turbine does not exceed an exhaust-gas-temperature upper limit;

a blade-path-temperature controller configured to calculate a blade-path-temperature control signal for controlling the fuel flow rate so that a blade path temperature of the turbine does not exceed a blade-path-temperature upper limit; and a selection circuit configured to select a control signal having the lowest value as the fuel-flow-rate command among the load control signal, the exhaust-gas-temperature control signal, and the blade-path-temperature control signal.

2. The fuel-flow-rate control device of claim 1, wherein said selection circuit is further configured to update the fuel-flow-rate upper limit so as to coincide with the exhaust-gas-temperature control signal when the state in which the exhaust-gas-temperature control signal is selected as the fuel-flow-rate command by said selection circuit lasts for a predetermined period of time; and wherein said selection circuit is further configured to maintain the fuel-flow-rate upper limit which is set at the switchover point when the exhaust-gas-temperature control signal selected as the fuel-flow-rate command is switched over to another control signal by said selection circuit.

3. The fuel-flow-rate control device of claim 1, further comprising:

a setting circuit for updating the fuel-flow-rate upper limit so as to coincide with the exhaust-gas-temperature control signal when the state in which the exhaust-gas-temperature control signal is selected as the fuel-flow-rate command by said selection circuit lasts for a predetermined period of time;

wherein said selection circuit is further configured to maintain the fuel-flow-rate upper limit which is set at the switchover point when the exhaust-gas-temperature control signal selected as the fuel-flow-rate command is switched over to another control signal by said selection circuit; and wherein said setting circuit is further configured to update the fuel-flow-rate upper limit to the present fuel-flow-rate command when the maintained state lasts for a predetermined period of time.

4. The fuel-flow-rate control device of claim 1, further comprising:
a setting circuit configured to set the fuel-flow-rate upper limit based on the fuel-flow-rate command obtained by said computing portion.

* * * * *